R. N. EVANS.
ANTISKID CHAIN.
APPLICATION FILED OCT. 4, 1910.
1,056,981.
Patented Mar. 25, 1913.
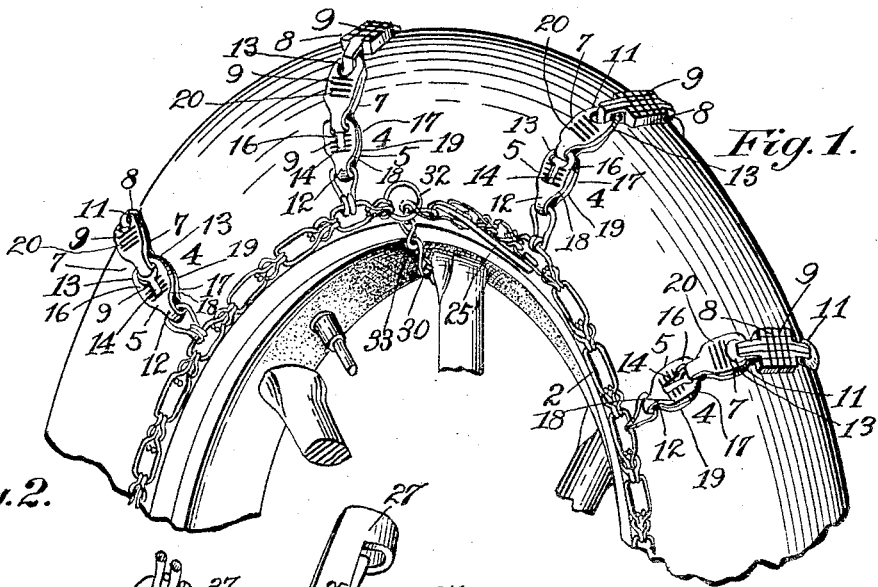
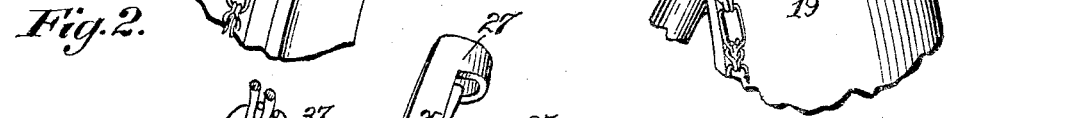
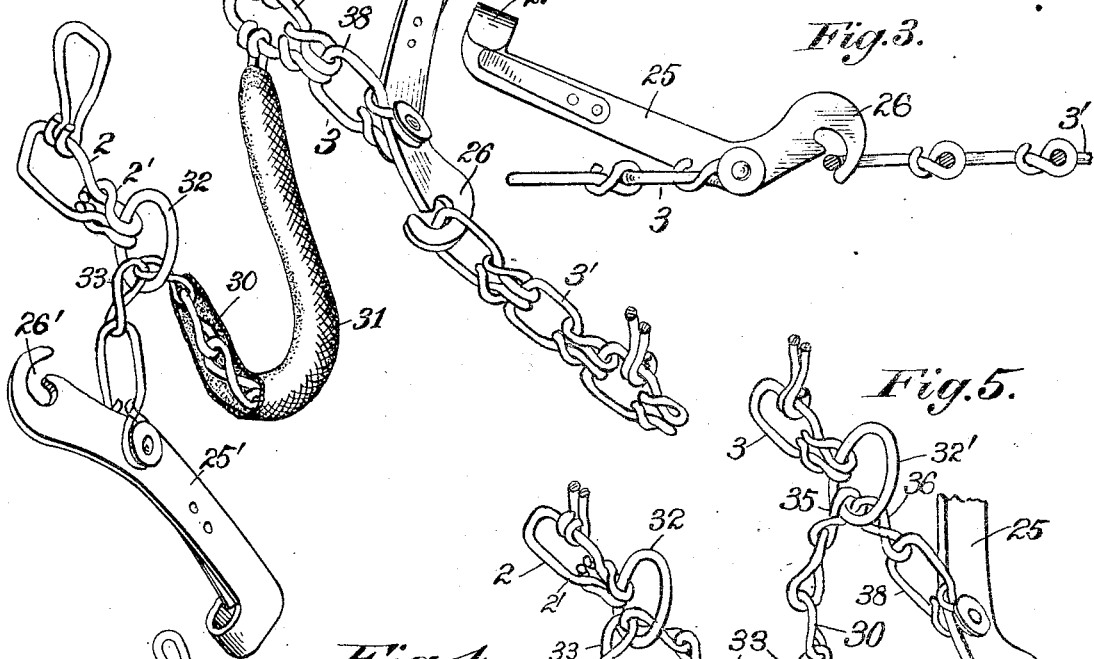
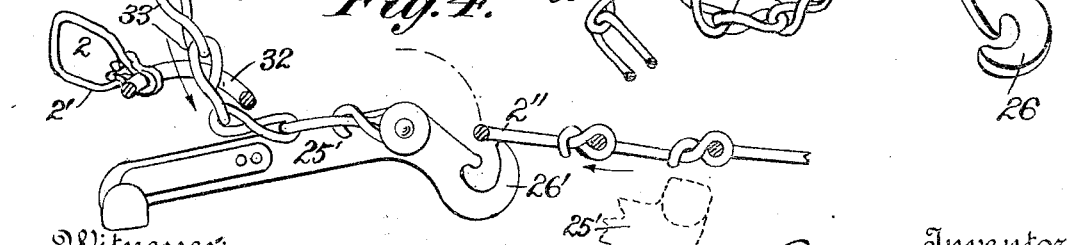
Witnesses:
Inventor
Robert N. Evans
By his Attorney

UNITED STATES PATENT OFFICE.

ROBERT N. EVANS, OF NEW YORK, N. Y., ASSIGNOR TO ATLAS CHAIN COMPANY, OF BROOKLYN, NEW YORK, A CORPORATION OF NEW YORK.

ANTISKID-CHAIN.

1,056,981.        Specification of Letters Patent.        Patented Mar. 25, 1913.

Application filed October 4, 1910. Serial No. 585,192.

*To all whom it may concern:*

Be it known that I, ROBERT N. EVANS, a citizen of the United States, residing at New York, borough of Brooklyn, in the county of Kings and State of New York, have invented certain new and useful Improvements in Antiskid-Chains, of which the following is a specification.

This invention relates to anti-skid devices commonly known as tire chains for vehicle tires particularly motor vehicle tires, the object of the invention being to provide an improved chain which may be readily and effectively secured to the wheel so as to prevent the creeping of the device around the wheel.

Heretofore it has been considered necessary that anti-skid chains be so attached to the tire that they may readily creep around the same when in use, and this is necessary with chains usually used, because of the construction thereof. It is, however, considered a disadvantage to have this creeping action of the chains around the tire if it can be avoided without injury to the tire or affecting appreciably the longevity of the tire. When the chains are permitted to creep around the tire they are in use more or less noisy, whereas by attaching the chains to the wheel to prevent this creeping action they are almost noiseless in use. Moreover when the chains are permitted to creep around the tire they tend to shift from one side of the tire to the other thus forming sharp edges on the links, and these sharp edges very seriously injure the tire. When chains with links formed of wire or rod are used sharp edges quickly develop, and unless these chains are permitted to creep around the tire they very soon injure it. Not only this, but the creeping action of the chains tends to draw in particles of gravel and dirt and rub them along the tire, and thus together with the frictional action between the creeping chains and the tire have a tendency to wear out the surface of the tire. By making the chains of a certain construction, whereby the formation of sharp edges on the cross members of the chains are avoided, there is no necessity of the chains creeping around the tire, since by forming the links of the cross members in the manner shown, there is no appreciable wear and no injury to the tire when such members are maintained in the same position at all times, while owing to the provision of a solid center link, which is intended to receive most of the wear, the longevity of the cross members is not appreciably impaired by maintaining them in a predetermined position relative to the tire.

The object therefore of the present improvement is to provide an improved antiskid chain so made and connected that it may be readily fixed to the wheel against material creeping movement without injury to the tire and without appreciably affecting the longevity of the chain.

A further object of the invention is the provision of improved anti-skid fastening means so constructed and assembled with the chain that the proper attachment of the chain to the wheel will be insured whenever the anti-skid chain is in use, for unless fastened to the wheel by the user in the manner shown it is impossible to attach the anti-skid chain to the wheel. In other words, the side chains carrying the cross members are so constructed and proportioned with relation to the anti-skid chain fastening means that unless the user fastens the anti-skid chain to the wheel so as to prevent material creeping thereof, it is impossible to use the chain. Thus by the present improvement, not only is there provided improved means for fastening the anti-skid chain to the wheel, but this means insures, whenever the anti-skid chain is used, that the same shall be attached to the wheel in the proper manner, so that the creeping of the chain entirely around the tire is prevented and the disadvantages hereinabove pointed out are avoided.

In the drawings accompanying and forming part of this specification, Figure 1 is a perspective side view of a portion of a wheel having this improved anti-skid chain attached thereto; Fig. 2 is a perspective view of a portion of such chain illustrating the improved means for attaching the same to the wheel; Fig. 3 is a view of one of the fastening levers for connecting one of the side chains to the wheel; Fig. 4 is a view illustrating the manner in which the fastening means must be used in order to secure the chain to the wheel, and illustrates that part of the structure shown at the left in Fig. 2; Fig. 5 illustrates that part shown at the right in Fig. 2, but with the cross chain fastening means secured to the side chain in a different manner from that shown in Fig. 2.

Similar characters of reference indicate corresponding parts in the several figures of the drawing.

When the links of an anti-skid chain are made up of wire or rods, the wear thereon soon forms sharp edges, in consequence of which it is necessary that the chain creep around the tire. This is undesirable for many reasons, some of which have been already pointed out. By forming the links, however, with flat bearing surfaces, and of proper size and shape, and by providing a solid center link upon which most of the wear will come, the necessity of having the chain creep around the tire is obviated.

In the present improvement the anti-skid tire chain comprises a pair of side chains 2 and 3, one at each side of the tire, of less diameter than the full diameter of the tire. At intervals there is connected to these side chains cross members 4 of such length that the side chains may run at the sides of the tire relatively near to the felly. Each of these cross chains is made up of flat faced tire bearing links hinged to each other and to a solid center link. In the present improvement each cross member comprises a pair of end links 5 of similar form, each having a hook for attachment to the side chains. Each of these end links 5 is articulated with a link 7 of somewhat different form, while each of these links 7 is articulated with an intermediate or solid link 8. This solid link, as well as its companion links, is provided with a roughened face 9 formed by projections for increasing the effective action of the chain on the roadway, and this solid link is also provided with a pair of laterally extending loops adapted to be inserted in a loop or loops 11 of the adjacent links 7. The links 5 and 7 are each made up of a pair of flat parallel spaced apart members connected by an integral bent portion 12 forming an eye or loop, and these flat members terminate in a loop or loops 13 for the reception of an eye or loop 12 or of the laterally extending eye or loop of the solid link. Each outer link 5 has its loop 13 communicating with a longitudinal slot 14, by reason of which the two links 5 and 7 may be readily assembled. This is accomplished by passing the link 7, before the two flat surfaces are bent together, through the slot 14 until the narrow bent portion forming the loop 12 is contiguous to such slot 14, whereupon the link 7 may be shifted into the loop 13 and the two parts forming the link 7 closed together. Each of these links 5 and 7 is otherwise the same, and comprises two flat members 16 and 17 having inwardly bent portions 18 and 19 shown as side bent portions for maintaining the two flat portions spaced apart. The inner flat portion 17 of the links constitutes a tire engaging surface, while the outer flat portion 16 of such links constitutes a tread surface, which, as hereinbefore stated, is roughened, as at 20. Each link is thus formed as a box link having a flat tire engaging surface, and by reason of this construction the formation of sharp edges on the link and the consequent injury and damage to the tire is avoided.

For securing the opposed ends of each side chain together, and the anti-skid chain upon the wheel, improved means is provided, so constructed and assembled as hereinbefore stated that unless the user uses the same in the manner intended the attachment of the anti-skid chain to the wheel is not possible. In the forms shown in Figs. 1, 2, 3 and 4 one end of the side chain 3 is provided with a pivotally connected lever 25 having a hook 26 adapted to engage the opposite end of the same side chain 3 whereupon on swinging the lever 25 the two ends will be brought toward each other and the end 27 having a snap hook brought into position to hook into one of the links of that portion of the side chain 3 designated as 3'. Secured to one of the links of the side chain is the fastening member shown in the form of a chain 30 suitably covered by some appropriate material, such as a tube 31 of canvas or rubber, to prevent injury to the finished surface of the felly or spoke. Secured to one end of the opposite side chain 2 is a ring 32 of sufficient size for the passage of the companion lever 25' and the chain 30. The opposed adjacent ends 2' and 2" of the side chain 2 are located such a distance apart that they cannot be pulled together and connected one with the other except by pulling the chain 30 through the link 32. In other words, the chain 30 is of sufficient length to permit one or more of its links 33 to make up the difference between the ends 2' and 2" of the side chain 2. In other words when the lever 25' and one or more of the links 33 of the chain 30 have been passed through the ring 32 then only will it be practicable to engage the hook 26' into the end link of that part of the side chain designated as 2". By then swinging the pivoted lever 25' in the same manner just described in connection with lever 25 it will be observed that the opposed spaced apart ends of the side chain 2 will not only be drawn toward each other, but that the attaching chain 30 will be drawn under the felly drawing the two side chains toward each other and insuring a proper fit of the anti-skid chain to the wheel against any appreciable creeping. By this organization it will be observed that the cross chain 30 not only secures the side chains of the anti-skid chain to the wheel, but it also acts as the means by which the opposed ends of the side chain 2 are secured together. If the cross chain is permitted to hang too loosely under the felly the link 33 thereof would consequently not be drawn through the ring 32, in consequence of which, owing to the relative disposition of the opposed ends 2′ and 2″ of the side chains, the hook 26′ would not reach across the interval or gap and therefore the opposed ends of the side chain could not be connected. Thus by the provision of the improved attaching means shown herein, the proper fastening of the anti-skid chain to the wheel is not only secured so that the creeping of the chain around the tire is avoided, but the opposed ends of the side chain are drawn tightly toward each other.

In the form shown in Fig. 5 the construction of the attaching chain 30 is the same at the left side thereof. At the right side, however the attaching chain has its link 35 secured to a ring 32′ similar to that shown at 32, one link, as 36, of the felly chain 30 extending, however, beyond the ring for the attachment of the lever 25. This link 36 corresponds with that portion of the link 37 of Fig. 2 between the point where the chain 30 is fixedly secured thereto and the point 38 of the lever link. In other words, it will be observed that in order to have the anti-skid cross chains properly spaced apart around the tire, the two side chains must be of substantially the same length, so that the length of the chain between the lever and the point where the felly chain 30 is secured thereto, as at the right in Fig. 2, and where it passes through the ring 32 at the left of Fig. 2 is preferably of the same length. In other words, in Fig. 5 the link 36 corresponds with the link 33, so that the pull on the two ring formed ends of the side chains will be equal. While in Fig. 2 the distance between the point where the felly chain 30 is secured to the link 37 and the point 38 is equivalent to the length of the link 33 to which the lever 25 is secured.

From the foregoing it will be observed that unless the user in applying the anti-skid chain to the wheel properly draws the felly chain 30 under the felly and through the ring 32 to have the link 33 at the outer side thereof, he cannot connect the two opposed ends of the side chain 2, and therefore cannot use the anti-skid chain on the wheel. In other words, by leaving the chain 30 loose under the felly the distance is such between the ends 2′ and 2″ of the side chain 2 that the lever will not reach across the space, but by pulling the felly chain through in the proper manner it is drawn under the felly to draw the two side chains toward each other and the anti-skid chain tightly on to the wheel, and at the same time tightly draws the two ends 2′ and 2″ toward each other, thus properly fastening the anti-skid chain on the wheel. This attaching or felly chain, as it is called herein for purposes of designation, must consequently pass between a pair of the spokes, and will in practice engage the rear side of one of the spokes, so that creeping of the chain forward will be prevented by the spoke, in a manner that will be obvious without further explanation.

I claim as my invention:

1. An anti-skidding chain for vehicle wheels, having two peripheral members one on each side of the wheel rim and transverse members disposed at suitable intervals running across the wheel tread and connecting said two peripheral members, the ends of one of said peripheral members being suitably locked together, the other peripheral member being shorter than the first named member so that a gap is formed between its ends, and an inner transverse member fastened at one end to the first named peripheral member, its other end being removably connected to both ends of said second member to bridge said gap.

2. An anti-skidding chain for vehicle wheels, having two peripheral members one on each side of the wheel rim and transverse members disposed at suitable intervals running across the wheel tread and connecting said two peripheral members, the ends of one of said peripheral members being suitably locked together, the other peripheral member being shorter than the first named member so that a gap is formed between its ends, and an inner transverse member fastened at one end to the first named peripheral member, its other end being looped through one end of said second member and removably attached to the other end of said member to bridge said gap.

3. An anti-skid chain for vehicle wheels having two peripheral members of less diameter than the wheel, one on each side of the wheel and transverse members disposed at suitable intervals running across the wheel tread and connecting said two peripheral members, one of said peripheral members being shorter than the other, so that a gap is formed between its ends and an inner transverse member fastened at one part to one of said peripheral members and having its other end detachably connected to both ends of the other peripheral member to bridge said gap.

4. An anti-skid chain for vehicle wheels having two peripheral members of less diameter than the wheel, one on each side of the wheel, and transverse members disposed at suitable intervals running across the wheel tread and connecting said two peripheral members, each of said peripheral members being sufficiently short to form a gap between its ends, whereby each is of insufficient length to meet around the circumference of the wheel and an inner transverse member connected to one end of one of said peripheral members and detachably connected to the other end thereof, and also detachably connected with both ends of the other peripheral member.

5. An anti-skid chain for vehicle wheels having two peripheral members, one on each side of the wheel and of less diameter than the wheel, and transverse members disposed at suitable intervals running across the wheel tread and connecting said two peripheral members, one of said peripheral members being shorter than the other so that a gap is formed between its ends whereby it is of insufficient length to meet around the circumference of the wheel, and an inner transverse member fastened at one part to one peripheral member and having its other end looped through one end of the shorter peripheral member and attached to the other end of the same member to bridge said gap.

6. An anti-skid chain for vehicle wheels having two peripheral members of less diameter than the wheel, one on each side of the wheel and transverse members disposed at suitable intervals running across the wheel tread and connecting said two peripheral members, one of said peripheral members being shorter than the other, so that a gap is formed between its ends, and an inner transverse member connected to both of said peripheral members, and also connected to one end of one of said peripheral members to bridge said gap.

7. An anti-skid chain for vehicle wheels having two peripheral members of less diameter than the wheel, one on each side of the wheel and transverse members disposed at suitable intervals running across the wheel tread and connecting said two peripheral members; one of said peripheral members being shorter than the other, so that a gap is formed between its ends, and an inner transverse member connected to both of said peripheral members, and also detachably connected to one end of one of said peripheral members to bridge said gap.

ROBERT N. EVANS.

Witnesses:
F. E. BOYCE,
GEORGE F. PURCELL.